(12) United States Patent
Watanabe et al.

(10) Patent No.: US 7,309,752 B2
(45) Date of Patent: Dec. 18, 2007

(54) POLYMER AND FILM FORMING COMPOSITION

(75) Inventors: Katsuyuki Watanabe, Shizuoka (JP); Hidetoshi Hiraoka, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 11/527,582

(22) Filed: Sep. 27, 2006

(65) Prior Publication Data

US 2007/0073019 A1    Mar. 29, 2007

(30) Foreign Application Priority Data

Sep. 28, 2005    (JP) .......................... P.2005-281709

(51) Int. Cl.
*C08F 36/20* (2006.01)
*C08F 4/28* (2006.01)

(52) U.S. Cl. ............... 526/282; 526/219.1; 526/227; 526/279; 524/547; 524/550; 524/553; 524/554

(58) Field of Classification Search ............. 526/279, 526/282, 219.1, 227, 547, 550, 553, 554
See application file for complete search history.

(56) References Cited

U.S. PATENT DOCUMENTS 6,858,700 B2 *   2/2005   Dahl et al. ................. 528/170
7,033,728 B2 *   4/2006   Dammel .................. 430/270.1
2005/0267308 A1 * 12/2005   Morita et al. ............... 556/465

FOREIGN PATENT DOCUMENTS

JP          2003-292878 A      10/2003

* cited by examiner

*Primary Examiner*—Fred Teskin
(74) *Attorney, Agent, or Firm*—Sughrue Mion Pllc.

(57) ABSTRACT

A polymer obtained by polymerizing, in a presence of a polymerization initiator, a compound having a cage structure with at least 11 carbon atoms and an ethylenic double bond; a film forming composition containing the polymer; an insulating film formed using the composition; and an electronic device.

11 Claims, No Drawings

POLYMER AND FILM FORMING COMPOSITION

BACKGROUND OF THE INVENTION

1. Field of the Invention

The present invention relates to a polymer having a cage structure. More specifically, the invention pertains to an insulating film forming composition to be used for electronic devices or the like and superior in film properties such as dielectric constant and mechanical strength and moreover, an electronic device having an insulating film available by using the composition.

2. Description of the Related Art

In recent years, power consumption and delay time have increased because the progress of high integration, multi-function and high performance in the field of electronic materials has led to an increase in circuit resistance and condenser capacity between interconnects. Particularly, an increase of delay time becomes a large factor for the reduction of signal speed of devices and generation of crosstalk so that reduction of parasitic resistance and parasitic capacitance is required in order to reduce this delay time and accelerate the speed of devices. As one concrete measure for reducing this parasitic capacitance, an attempt has been made to cover the periphery of interconnects with a low-dielectric-constant interlayer insulating film. In addition, the interlayer insulating film is expected to have heat resistance high enough to withstand the thin film formation step at the time of producing a mount board and post steps such as chip connection and pin insertion and also chemical resistance high enough to withstand a wet process. Moreover, Al interconnects have recently been replaced by low resistance Cu interconnects and it is therefore common practice to carry out planarization by CMP (chemical mechanical polishing). They are therefore required to have mechanical resistance high enough to withstand this process.

Although polybenzoxazole and polyimide are widely known as materials for insulating films having high heat resistance, insulating films obtained from them are not satisfactory from the viewpoints of low dielectric constant, low water absorption, durability and hydrolysis resistance because they contain a hetero atom having high polarity such as oxygen atom or nitrogen atom.

High heat-resistant resins having polyarylene ether as a principal chain are known, but further reduction in dielectric constant is desired in order to actualize a high speed device.

In order to obtain an insulating film having a reduced dielectric constant, use of a polymer skeleton composed of a saturated hydrocarbon having a small electronic polarizability is effective. An insulating film making use of a thermal polymer of an adamantane monomer containing a carbon double bond is disclosed in JP-A-2003-292878, but it has a dielectric constant of about 2.6 and a further reduction is required.

SUMMARY OF THE INVENTION

The present invention relates to a film forming composition for overcoming the above-described problems and a novel polymer useful for the composition. More specifically, the invention relates to a film forming composition to be used for electronic devices and capable of providing a film superior in film properties such as dielectric constant and mechanical strength; an insulating film available by using the composition; and an electronic device having the insulating film. (An "insulating film" is also referred to as a "dielectric film" or a "dielectric insulating film", and these terms are not substantially distinguished.)

The present inventors have found that the above-described problems can be overcome by the below-described constitution.

(1) A polymer obtained by polymerizing, in a presence of a polymerization initiator, a compound having a cage structure with at least 11 carbon atoms and an ethylenic double bond.

(2) The polymer as described in (1) above, wherein the polymerization initiator is selected from the group consisting of organic peroxides and azo compounds.

(3) The polymer as described in (1) or (2) above, which has a solubility, in cyclohexanone at 25° C., of 3 mass % or greater.

(4) The polymer as described in any of (1) to (3) above, wherein the compound having a cage structure is represented by formula (I):

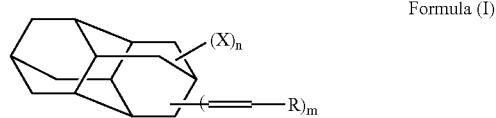

Formula (I)

wherein when two or more R's are present, the R's each independently represents a hydrogen atom, an alkyl group, an alkenyl group, an alkynyl group, an aryl group, an alkoxycarbonyl group, an aryloxycarbonyl group, a carbamoyl group, an acyl group or a silyl group;

m represents an integer of from 1 to 14;

X represents any substituent; and n represents an integer of from 0 to 13.

(5) A film forming composition comprising a polymer as described in any of (1) to (4) above.

(6) A film forming composition comprising:

a compound having a cage structure with at least 11 carbon atoms and an ethylenic double bond; and a polymerization initiator.

(7) The film forming composition as described in (5) or (6) above, which further comprises a coating solvent.

(8) An insulating film formed by utilizing a film forming composition as described in any of (5) to (7) above.

(9) An electronic device comprising an insulating film as described in (8) above.

DETAILED DESCRIPTION OF THE INVENTION

The present invention will next be described specifically.

The term "cage structure" as used herein means a molecule in which plural rings formed of covalent-bonded atoms define the capacity of the structure and in which all points existing inside the capacity cannot leave the capacity without passing through the rings. For example, an adamantane structure may be considered as the cage structure. On the other hand, a cyclic structure having a single crosslink which norbornane (bicyclo[2,2,1]heptane) or the like has cannot be considered as the cage structure since the ring of the single-crosslinked cyclic compound does not define the capacity of the compound.

The cage structure of the invention is characterized in that it is formed of at least 11 carbon atoms. The cage structure is composed of preferably from 11 to 30 carbon atoms, more preferably from 12 to 20 carbon atoms, still more preferably from 12 to 14 carbon atoms. When the cage structure composed of at least 11 carbon atoms is employed, electronic polarizability of a film lowers. In addition, a space is formed in the film owing to an increase in the bulkiness of the cage structure, which leads to a sufficient reduction in the dielectric constant. Moreover, it has been found that the cage structure with a greater number of atoms exhibits an unexpected effect, that is, enhancement of mechanical strength.

The carbon atoms as described herein do not embrace the carbon atoms of the linking group or the substituent bound to the cage structure. For example, it is regarded that 1-methyladamantane is composed of 10 carbon atoms.

The cage structure with at least 11 carbon atoms according to the invention is preferably a saturated aliphatic hydrocarbon such as diamantane, triamantane, tetramantane and dodecahedrane. Of these, diamantane is especially preferred from the standpoints of low dielectric constant, high mechanical strength, good solubility in a coating solvent and production suitability.

The compound having a cage structure according to the invention contains at least one ethylenic carbon double bond.

The cage structure in the invention is preferably monovalent to tetravalent, more preferably monovalent to trivalent, especially preferably divalent.

The group to be bound to the cage structure may be a substituent having a valence of one or more or a linking group having a valence of two or more.

The compound having a cage structure according to the invention has preferably a molecular weight of from 150 to 3000, more preferably from 200 to 2000, especially preferably from 220 to 1000.

The compound having a cage structure is especially preferably a compound represented by the following formula (I):

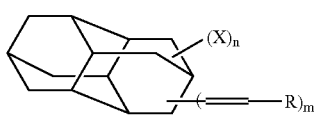

Formula (I)

In the formula (I),

R represents a hydrogen atom, an alkyl group (preferably, a $C_{1-10}$ alkyl group), an alkenyl group (preferably, a $C_{2-10}$ alkenyl group), an alkynyl group (preferably, a $C_{2-10}$ alkynyl group), an aryl group (preferably, a $C_{6-20}$ aryl group), an alkoxycarbonyl group (preferably, a $C_{2-10}$ alkoxycarbonyl group), an aryloxycarbonyl group (preferably, a $C_{7-20}$ aryloxycarbonyl group), a carbamoyl group (preferably, a $C_{1-10}$ carbamoyl group), an acyl group (preferably, a $C_{2-10}$ acyl group), or a silyl group (preferably, a $C_{0-20}$ silyl group). Of these, hydrogen atom, alkyl group (preferably, $C_{1-10}$ alkyl group), aryl group (preferably, $C_{6-20}$ aryl group), alkoxycarbonyl group (preferably, $C_{2-10}$ alkoxycarbonyl group), carbamoyl group (preferably, $C_{1-10}$ carbamoyl group), acyl group (preferably, $C_{2-10}$ acyl group), or silyl group (preferably, $C_{0-20}$ silyl group) are more preferred, with hydrogen atom and silyl group (preferably, $C_{0-20}$ silyl group) being especially preferred.

The letter m represents an integer of from 1 to 14, preferably 1 to 4, more preferably 1 to 3, especially preferably 2.

X represents any substituent. Examples of it include halogen atoms (fluorine atom, chlorine atom, bromine atom and iodine atom), linear, branched or cyclic $C_{1-10}$ alkyl groups (such as methyl, t-butyl, cyclopentyl and cyclohexyl), $C_{2-10}$ alkenyl groups (such as vinyl and propenyl), $C_{6-20}$ aryl groups (phenyl, 1-naphthyl and 2-naphthyl), $C_{2-10}$ acyl groups (such as benzoyl), $C_{6-20}$ aryloxy groups (such as phenoxy), $C_{6-20}$ arylsulfonyl groups (such as phenylsulfonyl), nitro group, cyano group, and silyl groups (such as triethoxysilyl, methyldiethoxysilyl and trivinylsilyl). Of these, preferred are fluorine atom, bromine atom, linear, branched or cyclic $C_{1-5}$ alkyl groups, $C_{2-5}$ alkenyl groups and silyl groups. These substituents may be substituted further with another substituent.

The letter "n" represents an integer of from 0 to 13, preferably from 0 to 2, more preferably 0.

As the compound of the invention represented by the formula (I), 1-vinyldiamantane, 4-vinyldiamantane, 4,9-divinyldiamantane, 1,6-divinyldiamantane, 1,4-divinyldiamantane, and 1,4,9-trivinyldiamantane are more preferred, with 4,9-divinyldiamantane and 1,6-divinyldiamantane being especially preferred.

It is especially preferred that the compound of the invention having a cage structure with at least 11 carbon atoms and an ethylenic double bond and the polymer of the invention each does not contain a nitrogen atom in view of dielectric constant and hygroscopic property of the film. It is more preferred that each of them is a compound other than polyimide, in other words, a compound free of a polyimide bond.

Specific examples of the compound of the invention having a cage structure with at least 11 carbon atoms and an ethylenic double bond will hereinafter be described, but the present invention is not limited to or by them.

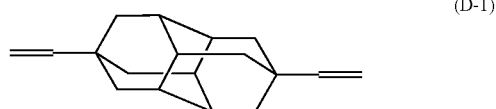

(D-1)

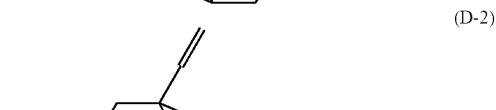

(D-2)

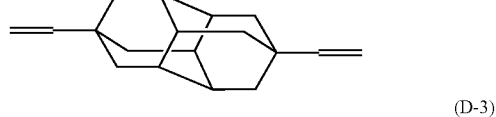

(D-3)

(D-4)

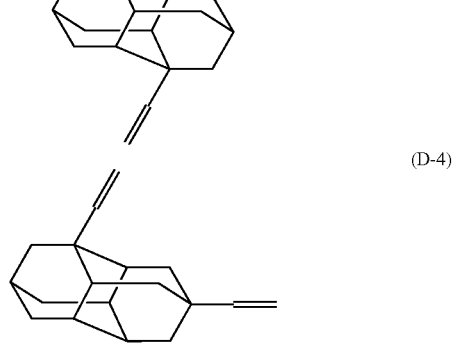

-continued

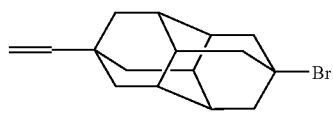 (D-5)

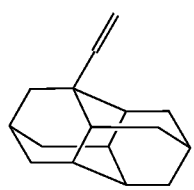 (D-6)

 (D-7)

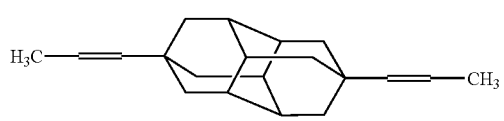 (D-8)

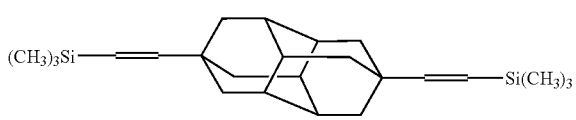 (D-9)

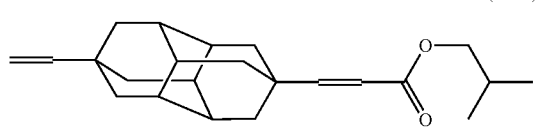 (D-10)

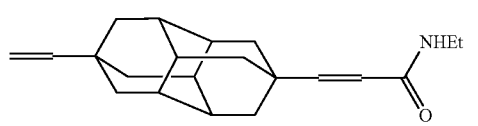 (D-11)

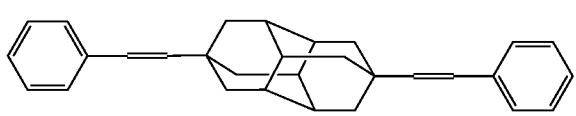 (D-12)

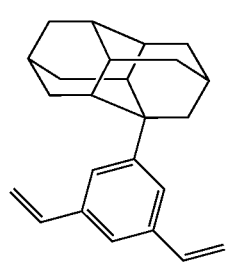 (D-13)

-continued

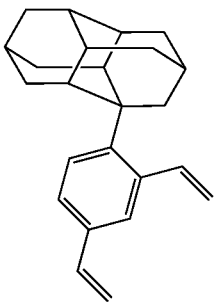 (D-14)

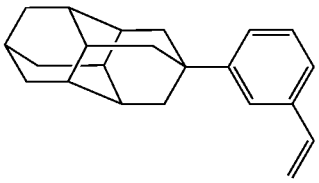 (D-15)

The polymer of the invention is characterized in that it is available by polymerizing, in the presence of a polymerization initiator (preferably a nonmetallic polymerization initiator), a compound having a cage structure with at least 11 carbon atoms and an ethylenic double bond. Use of a metal catalyst may become a cause for mixing of metal impurities in the film forming composition, but use of a polymerization initiator (especially, a nonmetallic one) is advantageous because it does not cause such a problem.

The polymerization initiator usable in the invention preferably exhibits activity, generating free radicals such as carbon radicals or oxygen radicals by heating. Organic peroxides and organic azo compounds are especially preferred.

Preferred examples of the organic peroxides include ketone peroxides such as "PERHEXA H", peroxyketals such as "PERHEXA TMH", hydroperoxides such as "PERBUTYL H-69", dialkylperoxides such as "PERCUMYL D", "PERBUTYL C" and "PERBUTYL D", diacyl peroxides such as "NYPER BW", peroxy esters such as "PERBUTYL Z" and "PERBUTYL L", and peroxy dicarbonates such as "PEROYL TCP" (each, trade name; product of NOF Corporation).

Examples of the organic azo compound include azonitrile compounds such as "V-30", "V-40", "V-59", "V-60", "V-65" and "V-70", azoamide compounds such as "VA-080", "VA-085", "VA-086", "VF-096", "VAm-110" and "VAm-111", cyclic azoamidine compounds such as "VA-044" and "VA-061", and azoamidine compounds such as "V-50" and "VA-057" (each, trade name; product of Wako Pure Chemical Industries).

In the invention, these polymerization initiators may be used either singly or in combination.

The amount of the polymerization initiator of the invention is preferably from 0.0001 to 1 mole, more preferably from 0.001 to 0.5 mole, still more preferably from 0.01 to 0.2 mole, per mole of the compound, as a monomer, having a cage structure with at least 11 carbon atoms and an ethylenic double bond.

As the solvent to be used for polymerization reaction, any solvent capable of dissolving therein a raw material monomer having a necessary concentration and having no adverse effects on the properties of a film formed from the resulting polymer can be used. Examples include water; alcohol solvents such as methanol, ethanol and propanol; ketone solvents such as alcohol acetone, methyl ethyl ketone, methyl isobutyl ketone, cyclohexanone and acetophenone; ester solvents such as ethyl acetate, butyl acetate, propylene glycol monomethyl ether acetate, γ-butyrolactone, and methyl benzoate; ether solvents such as dibutyl ether and anisole; aromatic hydrocarbon solvents such as toluene, xylene, mesitylene and 1,3,5-triisopropylbenzene; amide solvents such as N-methylpyrrolidinone and dimethylacetamide; halogen-containing solvents such as carbon tetrachloride, dichloromethane, chloroform, 1,2-dichloroethane, chlorobenzene, 1,2-dichlorobenzene and 1,2,4-trichlorobenzene; and aliphatic hydrocarbon solvents such as hexane, heptane, octane and cyclohexane. Of these, more preferred are acetone, methyl ethyl ketone, methyl isobutyl ketone, cyclohexanone, acetophenone, ethyl acetate, propylene glycol monomethyl ether acetate, γ-butyrolactone, anisole, tetrahydrofuran, toluene, xylene, mesitylene, 1,3,5-triisopropylbenzene, 1,2-dichloroethane, chlorobenzene, 1,2-dichlorobenzene and 1,2,4-trichlorobenzene; still more preferred are tetrahydrofuran, γ-butyrolactone, anisole, toluene, xylene, mesitylene, 1,3,5-triisopropylbenzene, 1,2-dichloroethane, chlorobenzene, 1,2-dichlorobenzene and 1,2,4-trichlorobenzene, of which γ-butyrolactone, anisole, mesitylene, 1,3,5-triisopropylbenzene, 1,2-dichlorobenzene, 1,2,4-trichlorobenzene are especially preferred. These solvents may be used either singly or in combination.

The concentration of the monomer in the reaction mixture is preferably from 1 to 50 wt. %, more preferably from 5 to 30 wt. %, especially preferably from 10 to 20 wt. %.

The optimum conditions for the polymerization reaction in the invention differ, depending on the kind or concentration of the polymerization initiator, monomer or solvent. The internal temperature is preferably from 0 to 200° C., more preferably from 50 to 170° C., especially preferably from 100 to 150° C., while the reaction time is preferably from 1 to 50 hours, more preferably from 2 to 20 hours, especially preferably from 3 to 10 hours.

In order to suppress the inactivation of the polymerization initiator due to oxygen, the reaction is performed preferably in an inert gas atmosphere (such as nitrogen or argon). The oxygen concentration during the reaction is preferably 100 ppm or less, more preferably 50 ppm or less, especially preferably 20 ppm or less.

The polymer obtained by polymerization has a mass average molecular weight of preferably from 1000 to 500000, more preferably from 5000 to 300000, especially preferably from 10000 to 200000.

The compound of the invention having a cage structure and an ethylenic double bond can be synthesized, for example, by reacting commercially available diamantane, as a raw material, with bromine in the presence or absence of an aluminum bromide catalyst to introduce a bromine atom into a desired position, effecting Friedel-Crafts reaction between the reaction product and vinyl bromide in the presence of a Lewis acid such as aluminum bromide, aluminum chloride or iron chloride to introduce a 2,2-dibromoethyl group into the product, treating it with a strong base for HBr removal, thereby converting the 2,2-dibromoethyl group into an ethynyl group, and then reducing into a vinyl group by using diisobutylaluminum hydride.

It is preferred that the solubility of the polymer in cyclohexanone at 25° C. is 3 mass % or greater.

In order to prevent precipitation of insoluble matters with the passage of time during storage of the coating solution, the polymer has preferably a higher solubility. The solubility of the polymer in cyclohexanone at 25° C. is more preferably 7 mass % or greater, especially preferably 10 mass % or greater. (In this specification, mass ratio is equal to weight ratio.)

The polymer of the invention may be used alone or two or more polymers may be used in combination.

The film forming composition of the invention contains the above-described polymer, or the above-described compound having a cage structure with at least 11 carbon atoms and an ethylenic double bond and the above-described polymerization initiator.

The film forming composition of the invention can be used as a coating solution after dissolved in a solvent. No particular limitation is imposed on the coating solvent. Examples include alcohol solvents such as methanol, ethanol, isopropanol, 1-butanol, 2-ethoxymethanol and 3-methoxypropanol; ketone solvents such as acetone, acetylacetone, methyl ethyl ketone, methyl isobutyl ketone, 2-pentanone, 3-pentanone, 2-heptanone, 3-heptanone and cyclohexanone; ester solvents such as ethyl acetate, propyl acetate, butyl acetate, isobutyl acetate, pentyl acetate, ethyl propionate, propyl propionate, butyl propionate, isobutyl propionate, propylene glycol monomethyl ether acetate, methyl lactate, ethyl lactate and γ-butyrolactone; ether solvents such as diisopropyl ether, dibutyl ether, ethyl propyl ether, anisole, phenetole and veratrol; aromatic hydrocarbon solvents such as mesitylene, ethylbenzene, diethylbenzene, propylbenzene and 1,2-dichlorobenzene; and amide solvents such as N-methylpyrrolidinone and dimethylacetamide. These solvents may be used either singly or in combination.

Of these, acetone, propanol, cyclohexanone, propylene glycol monomethyl ether acetate, methyl lactate, ethyl lactate, γ-butyrolactone, anisole, mesitylene and 1,2-dichlorobenzene are more preferred, with cyclohexanone, propylene glycol monomethyl ether acetate, γ-butyrolactone and anisole being especially preferred.

The solid concentration of the film forming composition of the invention is preferably from 3 to 50 mass %, more preferably from 4 to 15 mass %, especially preferably from 5 to 10 mass %.

The metal content, as an impurity, of the film forming composition of the invention is preferably as small as possible. The metal content is preferably 10 ppm or less, more preferably 1 ppm or less, especially preferably 100 ppb or less.

Moreover, additives such as radical generator, nonionic surfactant, nonionic fluorosurfactant, silane coupling agent and adhesive may be added to the film forming composition of the invention insofar as they do not impair the various properties (heat resistance, dielectric constant, mechanical strength, coating properties, adhesion and the like) of an insulating film thus obtained.

Examples of the nonionic surfactant include octyl polyethylene oxide, decyl polyethylene oxide, dodecyl polyethylene oxide, octyl polypropylene oxide, decyl polypropylene oxide and decyl polypropylene oxide. Examples of the nonionic fluorosurfactant include perfluorooctyl polyethylene oxide, perfluorodecyl polyethylene oxide and perfluorodecyl polyethylene oxide. Examples of the silane coupling agent include vinyl trimethoxysilane, vinyltriethoxysilane, vinyltriacetoxysilane, allyltrimethoxysilane, allyltriethoxysilane, divinyldiethoxysilane and trivinylethoxysilane.

There exists a suitable range of the amount of the additive to be added, depending on the using purpose of the additive or solid concentration of the coating solution. In general, the amount (mass %) in the coating solution is preferably from 0.001% to 10%, more preferably from 0.01% to 5%, especially preferably from 0.05% to 2%.

By the addition, in advance, of a foaming agent to the film forming composition to be used in the invention, a porous film can be formed. This enables reduction in dielectric constant of the film. Although no particular limitation is imposed on the foaming agent to be added to form a porous film, an organic compound having a higher boiling point than that of the solvent of the coating solution, a thermally decomposable low molecular compound, thermally decomposable polymer or the like can, for example, be used.

The amount of the foaming agent to be added is preferably from 1 to 50 mass %, more preferably from 5 to 30 mass %, especially preferably from 10 to 20 mass % based on the mass of the polymer used for the formation of the film.

A film available by using the film forming composition of the invention can be formed by applying the film forming composition to a substrate by a desirable method selected from spin coating, roller coating, dip coating, scanning and the like, and then distilling off the solvent by heating. No particular limitation is imposed on the heating method and an ordinarily employed method, for example, heating using a hot plate or heating furnace, or heating by photoirradiation with a xenon lamp for RTP (rapid thermal processor) is employable herein.

It is especially preferred to cure the polymer of the invention by heating after application of it to a substrate. For example, polymerization reaction during post-heat treatment of a carbon double bond remaining in the polymer can be utilized for it. With regard to the conditions of this post-heat treatment, the temperature is preferably from 100 to 450° C., more preferably from 200 to 420° C., especially preferably from 350 to 400° C., while the time is preferably from 1 minute to 2 hours, more preferably from 10 minutes to 1.5 hours, especially preferably from 20 minute to 1 hour.

The post-heat treatment may be performed in several steps. It is especially preferred to carry out this post-heat treatment in a nitrogen atmosphere in order to prevent thermal oxidation by oxygen.

The film available by using the film forming composition of the invention can be used for a variety of purposes, for example, it is suited as an insulating film in electronic parts such as semiconductor device and multichip module multilayer wiring board. It can also be used as, in addition to an interlayer insulating film for semiconductor, surface protection film and a buffer coat film, a passivation film in LSI, α-ray shielding film, cover lay film of a flexographic plate, overcoat film, cover coat of a flexible copper-lined plate, solder resist film, or liquid-crystal alignment film.

As another using purpose, it can be used as a conductive film by doping the film of the invention with an electron donor or acceptor, thereby imparting it with conductivity.

EXAMPLES

The present invention will hereinafter be described by Examples. It should however be borne in mind that the scope of the invention is not limited to or by them.

Example 1

In accordance with the synthesis method as described in *Macromolecules*, 5266(1991), 4,9-diethynyldiamantane was synthesized. The resulting 4,9-diethynyldiamantane was cooled to 0° C. in toluene, followed by the dropwise addition of diisobutylaluminum hydride in an equimolar amount relative to the ethynyl group. After stirring for three hours, a saturated aqueous solution of ammonium chloride was added to the reaction mixture to separate it into layers. A crude product obtained by concentrating the organic layer was purified by silica gel chromatography while using hexane as an eluent, whereby 4,9-divinyldiamantane was synthesized.

In the next place, 2 g of the 4,9-divinyldiamantane 0.1 g of dicumyl peroxide ("PERCUMYL D", trade name; product of NOF Corporation), and 10 ml of orthodichlorobenzene were stirred for 5 hours at an internal temperature of 140° C. under a nitrogen stream, whereby they were polymerized. After the reaction mixture was cooled to room temperature, it was added to 100 ml of methanol. A solid thus precipitated was collected by filtration, and then washed with methanol, whereby 1.0 g of Polymer (A) having a mass-average molecular weight of about 30000 was obtained.

The solubility of Polymer (A) in cyclohexanone at 25° C. was 15 mass % or greater.

A coating solution was prepared by completely dissolving 1.0 g of Polymer (A) in 10 g of cyclohexanone. The resulting solution was filtered through a 0.1-μm filter made of tetrafluoroethylene and then, spin-coated onto a silicon wafer. The resulting film was heated at 250° C. for 60 seconds on a hot plate under a nitrogen stream, and then cured (calcined) for 60 minutes in an oven of 400° C. purged with nitrogen. As a result, a uniform 0.5-μm thick film with no foreign matters formed therein was formed. The dielectric constant of the film thus obtained was calculated from the capacitance value at 1 MHz by using a mercury probe (product of Four Dimensions) and "HP 4285A LCR meter" (trade name; product of Yokogawa Hewlett Packard), and it was 2.40. As a result of measurement by using "Nano Indenter SA2" (trade name; product of MTS Systems), the Young's modulus of the film was 7.7 GPa.

Example 2

Under a nitrogen stream, 2 g of 4,9-divinyldiamantane, 1,1'-azobis(cyclohexane-1-carbonitrile) ("V-40", trade name; product of Wako Pure Chemical Industries) and 10 ml of chlorobenzene were stirred at an internal temperature of 100° C. for 5 hours to polymerize them. After the reaction mixture was cooled to room temperature, it was added to 100 ml of methanol. The solid thus precipitated was collected by filtration and washed with methanol, whereby 1.0 g of Polymer (B) having a mass-average molecular weight of about 10000 was obtained.

The solubility of Polymer (B) in cyclohexanone at 25° C. was 15 mass % or greater.

A coating solution was prepared by completely dissolving 1.0 g of Polymer (B) in 10 g of cyclohexanone. The resulting solution was filtered through a 0.1-μm filter made of tetrafluoroethylene, and then spin coated onto a silicon wafer. After heating at 250° C. for 60 seconds on a hot plate under a nitrogen stream, the resulting film was cured (calcined) for 60 minutes in an oven of 400° C. purged with nitrogen, whereby a uniform 0.5 μm thick film having no foreign matters formed therein was obtained. The film had a dielectric constant of 2.41 and Young's modulus of 7.9 GPa.

Example 3

In a similar manner to Example 1 except for the use of 1,6-divinyldiamantane instead of 4,9-divinyldiamantane, 0.9 g of Polymer (C) was synthesized. As a result of GPC measurement, the resulting polymer had a mass-average molecular weight of about 20000.

The solubility of Polymer (C) in cyclohexanone at 25° C. was 15 mass % or greater.

A 10 mass % solution of the polymer in cyclohexanone was prepared. After filtration through a 0.2-μm filter made of TFE, the resulting solution was spin-coated on a silicon wafer. The film thus obtained was cured (calcined) at 400° C. for 60 minutes in a furnace purged with nitrogen, whereby a uniform 0.5 μm thick film having no foreign matters formed therein was obtained.

The resulting film had a specific constant of 2.37 and Young's modulus of 7.5 GPa.

Comparative Example 1

In a similar synthesis process to that employed for the synthesis of 4,9-divinyldiamantane, 1,3-divinyladamantane was synthesized.

As in Example 1 except for the use of 1,3-divinyladamantane instead of 4,9-divinyldiamantane, 0.9 g of Polymer (D) was synthesized. As a result of GPC measurement, the polymer had a mass-average molecular weight of about 20000.

A film was formed in accordance with the process of Example 1 by using Polymer (D). The resulting film had a dielectric constant of 2.6 and Young's modulus of 3.0 GPa.

It has been found that the insulating film formed using the polymer of the invention is superior in dielectric constant and Young's modulus to those of the film obtained in Comparative Example.

The polymer of the invention having a cage structure is soluble in a coating solvent such as cyclohexanone and can provide a uniform film forming composition free of precipitates. The film formed using the composition has a low dielectric constant and high mechanical strength so that it is suited as an interlayer insulating film for electronic devices or the like.

The entire disclosure of each and every foreign patent application from which the benefit of foreign priority has been claimed in the present application is incorporated herein by reference, as if fully set forth.

What is claimed is:

1. A polymer obtained by polymerizing, in the presence of a polymerization initiator, a compound having a cage structure with at least 11 carbon atoms and an ethylenic double bond, wherein the compound having a cage structure is represented by formula (I):

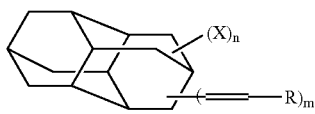

Formula (I)

wherein when two or more R's are present, the R's each independently represents a hydrogen atom, an alkyl group, an alkenyl group, an alkynyl group, an aryl group, an alkoxycarbonyl group, an aryloxycarbonyl group, a carbamoyl group, an acyl group or a silyl group;

m represents an integer of from 1 to 14;

X represents any substituent; and n represents an integer of from 0 to 13.

2. The polymer according to claim 1,
wherein the polymerization initiator is selected from the group consisting of organic peroxides and azo compounds.

3. The polymer according to claim 1, which has a solubility, in cyclohexanone at 25° C., of 3 mass % or greater.

4. A film forming composition comprising a polymer according to claim 1.

5. A film forming composition comprising:
a compound having a cage structure with at least 11 carbon atoms and an ethylenic double bond; and
a polymerization initiator,
wherein the compound having a cage structure is represented by formula (I):

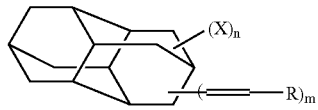

Formula (I)

wherein when two or more R's are present, the R's each independently represents a hydrogen atom, an alkyl group, an alkenyl group, an alkynyl group, an aryl group, an alkoxycarbonyl group, an aryloxycarbonyl group, a carbamoyl group, an acyl group or a silyl group;

m represents an integer of from 1 to 14;

X represents any substituent; and n represents an integer of from 0 to 13.

6. The film forming composition according to claim 4, which further comprises a coating solvent.

7. An insulating film formed by utilizing a film forming composition according to claim 4.

8. An electronic device comprising an insulating film according to claim 7.

9. The film forming composition according to claim 5, which further comprises a coating solvent.

10. An insulating film formed by utilizing a film forming composition according to claim 5.

11. An electronic device comprising an insulating film according to claim 10.

* * * * *